United States Patent [19]

Gerhold

[11] Patent Number: 4,470,114
[45] Date of Patent: Sep. 4, 1984

[54] HIGH SPEED INTERCONNECTION NETWORK FOR A CLUSTER OF PROCESSORS

[75] Inventor: Mark L. C. Gerhold, Paoli, Pa.

[73] Assignee: Burroughs Corporation, Detroit, Mich.

[21] Appl. No.: 353,415

[22] Filed: Mar. 1, 1982

[51] Int. Cl.³ .............................................. G06F 15/16
[52] U.S. Cl. .................................................... 364/200
[58] Field of Search ............... 364/200, 200 MS File; 340/825.5; 370/85, 89

[56] References Cited

U.S. PATENT DOCUMENTS 3,916,108 10/1975 Schwartz .............................. 370/85
4,402,040 8/1983 Evett .................................... 364/200

Primary Examiner—Raulfe B. Zache
Attorney, Agent, or Firm—Mervyn L. Young; Kevin R. Peterson

[57] ABSTRACT

A high speed interconnect network for a relatively large number of processors from as few as five to a hundred or more where the information transfers are serial-by-byte in a time multiplexed manner so that when one or more processors is ready to transmit, there will be an information byte being transmitted every clock time. A bus arbiter controls access to a local bus in a round-robin fashion when one or more than one processor is requesting access to the local bus. The bus arbiter also serves for connection to an overall global loop of bus arbiters each of which has a local bus and a plurality of individual processors.

4 Claims, 8 Drawing Figures

HIGH SPEED INTERCONNECTION NETWORK FOR A CLUSTER OF PROCESSORS

BACKGROUND OF THE INVENTION

1. Field of the Invention

This invention relates to a high speed interconnect network for a cluster of processors and, more particularly, for such a network which is adapted to interconnect a number of concurrently active microprocessors via a common system backplane bus.

2. Description of the Prior Art

With the advent of multiprocessing, processors normally dealt with one or more main memories through some sort of crosspoint exchange such as is disclosed in the Lynch et al U.S. Pat. Nos. 3,302,182 and 3,411,139. However, the processors did not directly communicate with each other. Furthermore, such a crosspoint exchange was expensive to manufacture since it was only employed in large computer systems having relatively large data transfer rates.

Most of the early work done in networking was more concerned with coupling peripheral devices such as terminals to the main memory by way of an I/O controller. Usually, data transfer from the peripheral devices to the I/O controller was in a serial-by-bit manner although in certain situations serial-by-byte transfers were employed. However, all transfers were under control of the I/O controller and the peripheral devices or terminals did not communicate with one another. A more recent example of such serial connection of terminals to a controller is illustrated in the Seitz et al U.S. Pat. No. 4,156,277.

In more recent times, networks for terminals have been developed without requiring a controller for data transfer between the terminals which have their own controllers in the form of microprocessors. However, such networks employed serial data transfers due to the relatively low switching speeds of the individual microprocessors. An example of such a local area network is illustrated in the Malcolm et al U.S. patent application Ser. No. 145,606, filed May 1, 1980 and assigned to the assignee of the present invention.

Such networks were designed for terminals each of which was provided with its own control processor and it was recognized that networks of processors per se could be created for concurrent processing with processors communicating with one another and usually being provided with their own memories for storage. Networks of such concurrent processors are illustrated in the Barton et al U.S. Pat. No. 4,307,446, and in the Hagenmaier et al U.S. patent application, Ser. No. 281,065 filed July 7, 1981 and assigned to the assignee of the present invention. However, in both of these references data transfer was still serial-by-bit because of the low transfer rate required between the individual processors which were still microprocessors embodied in individual integrated circuit chips or else on a wafer containing a number of such integrated dies. Furthermore, information transfer was by way of packets of information and, once a processor had access to a channel or bus, other processors could not transmit without causing collisions and loss of information.

It has now been recognized that a large number of such processors can be coupled together to control, for example, large data comm networks. However, because of the demands of such networks, it is desirable to increase the throughput of the overall processor network which requires a relatively high speed cross connection even though the transfer rates of individual procssors is relatively small.

It is then an object of the present invention to provide a high speed network for transfer of information between processors that are concurrently active.

A further object of the present invention is to provide a high speed network between processors that have characteristically lower speeds than that of the network without slowing down the network to the characteristic speeds of the processors.

Another object of the present invention is to provide such a high speed network for a relatively large number of processors which may be microprocessors that are coupled across a common backplane by the network.

It is still another object of the present invention to provide a network for a relatively large number of processors that can be expanded to accommodate even greater numbers of processors.

SUMMARY OF THE INVENTION

In order to accomplish the above-identified objects, the present invention is directed toward a network formed of one or more local transfer busses, which are adapted to transfer information in a serial-by-byte manner from one of a number of processors coupled to the bus to another processor, and to a bus arbiter which controls the priority of which processor gets access to the bus. Information transfer on the bus is time multiplexed so that, when the demand for a number of processors to communicate with one another exists, a plurality of data transfers is occuring with each transmitting processor inserting a byte on the bus during consecutive time slots, each processor transmitting one byte at a time as allocated by the bus arbiter.

It is, then, a feature of the present invention to provide an information transfer bus for a plurality of processors coupled thereto and a bus arbiter to assign access of the bus to respective ones of said processors so that data transfer on the bus is time multiplexed with processor access being controlled by the bus arbiter.

It is another feature of the present invention to provide such a bus arbiter which may be connected to other bus arbiters by system busses so that the network of concurrent processors can be expanded as required.

DESCRIPTION OF THE DRAWINGS

The above and other objects and advantages of the present invention will become more readily apparent from a review of the following specification when taken in conjunction with the drawings wherein.

GENERAL DESCRIPTION OF THE INVENTION

Figure 1:
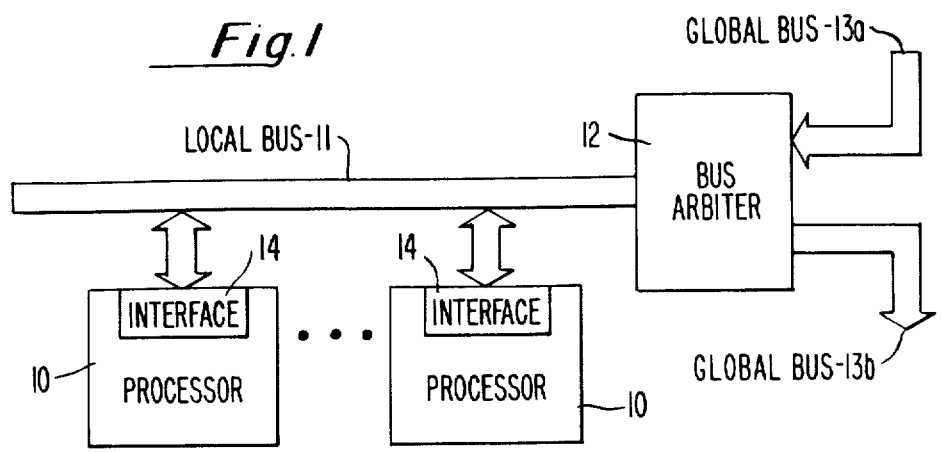
FIG. 1 is a diagram of a network of processors employing the present invention.

The present invention is directed towards an interconnection network for a number of processors and a concurrent processing system. A general diagram of the system employing the present invention is illustrated in FIG. 1. As shown herein, a plurality of processors 10 are coupled to local bus 11, each processor being provided with a processor interface 14 which includes a direct memory access storage and will be more thoroughly described below. Each processor 10 may be a microprocessor such as Intel 8086 or Zilog Z80 or other microprocessors, micro computers, or bit slice processors that are commercially available. The interconnection network of the present invention is adapted to interconnect a number of such procesors from as few as two to as many as a hundered or more.

Figure 7:
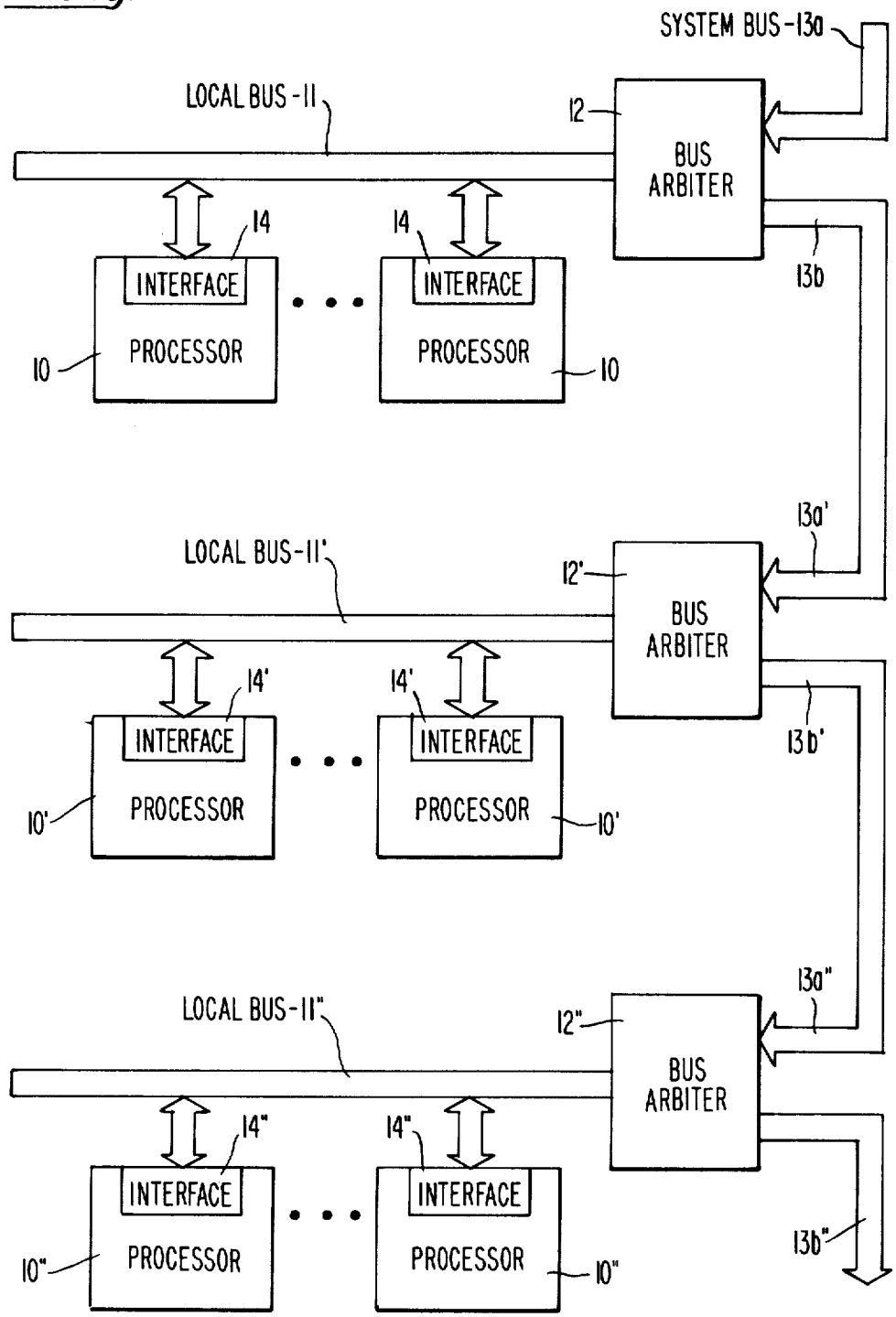
FIG. 7 is a diagram of a network of bus arbiters, local buses and processors of the type shown in FIG. 1.

Access to the bus 11 by each of processors 10 is controlled by bus arbiter 12 that is more thoroughly described below and which has provision for connection to other bus arbiters by way of the global bus-in 13a and global bus-out 13b which form a part of the global loop that can be expanded as required. As a practical matter, with current state of the art technology, the respective processors 10 and bus arbiter 12 are each mounted on a separate printed circuit board with the local bus 11 connecting them across a single backplane and with the global loop formed of a plurality of global busses 13a and and 13b being implemented as front plane ribbon cables to connect respective bus arbiters 12 and their corresponding printed circuit boards together. FIG. 7 shows how the respective bus arbiters 12, 12' and 12" and their corresponding local buses and processors are coupled together by global buses to form a global loop.

The respective local buses 11 are time multiplexed so that each bus is shared among a number of simultaneous packet transmissions between various processors 10 coupled to that bus. To this end, the local bus 11 is designed for a total data transfer rate of approximately 40 megabits per second which can accommodate a number of such simultaneous transmissions since the data transfer rate of the respective microprocessors would be on the order of one megabit per second.

The present invention employs two methods of sending information across a local bus. The normal method is to establish a logical channel between a source and a destination and to send a frame or parcel of information between them. This is called point-to-point (PTP) transmission. However, it is sometimes useful to send information to all processors attached to the bus rather than just one. With this broadcast capability, the only limitation is that there is only one broadcast channel per system thus limiting the total broadcast bandwidth to that of a single virtual channel.

Figure 2A:
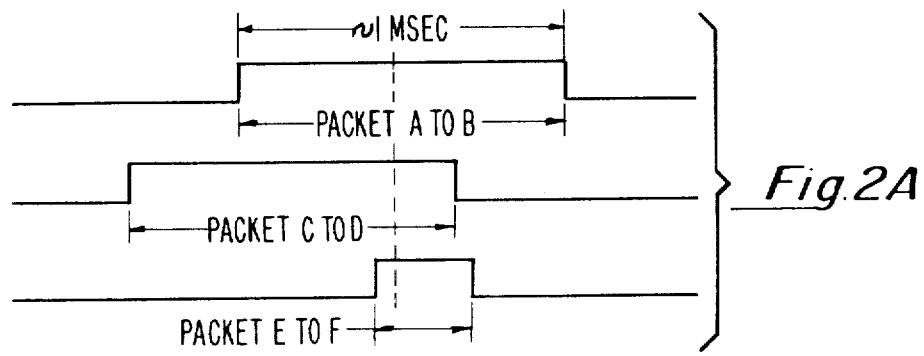
FIGS. 2A and 2B are sets of waveforms illustrating the timing of the byte transfers as they appear on the bus of the present invention.

As was indicated above, one of the advantages of the present invention is the resolution of the data transfer rate of the local bus and that of the individual microprocessor. This is achieved by time multiplexing the byte segments that are transferred between the various processors by the local bus. From a macroscopic point of view, time multiplexing appears to allow the overlapping data parcels to be sent across the local bus. Each of these parcels is the result of a "virtual channel" established between a source and a destination. The invention allows one virtual channel for each destination and one for the broadcast channel. This macroscopic point is indicated generally in FIG. 2A wherein, for example, a packet is being transmitted from the processor A to processor B while another packet is being transmitted from processor C to processor D and a third packet is being transmitted from processor E to processor F with the transmission time for each packet being more or less approximately one millisecond in duration.

Figure 2B:
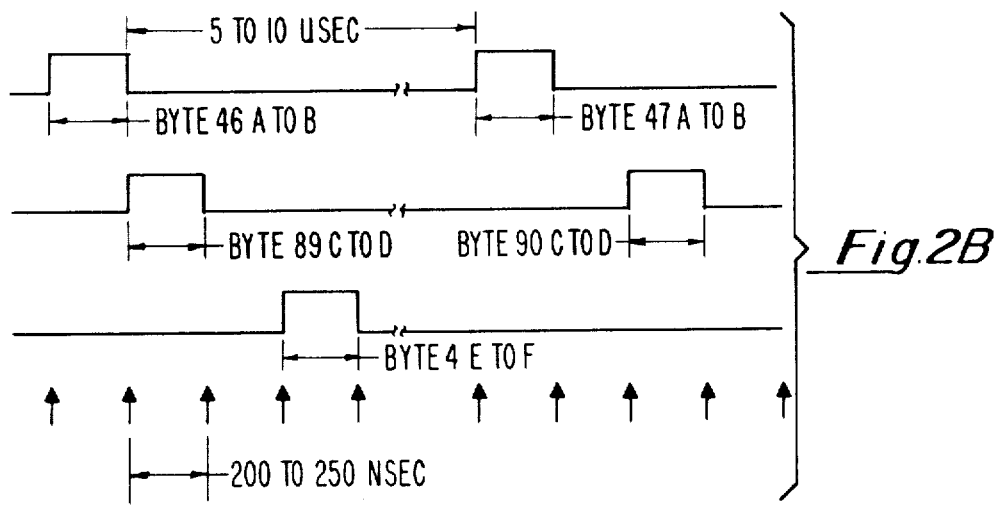

More specifically, a microscopic view of the action of the time multiplexing employed by the present invention is illustrated in FIG. 2B. It will be understood that there is only one physical channel for each arbiter in the interconnection network of the present invention and that only one processor can transmit one byte of data at a time. As indicated in FIG.2B, processor A transmits one byte during a time duration of approximately 200 to 250 nanoseconds and then processor C transmits a byte. At a later time processor E transmits a byte of data with the cycle being repeated until each of the processors has transmitted its full packet of information.

Byte transfers form the basis of all transmission across the local bus. There a number of different types of such transfers. Some transfers send bytes of data point-to-point or by way of a broadcast mode while other transfers are used to gain access to a destination or the broadcast channel. The latter types are still varities of byte transfers even though there may be no data associated with them. Each transfer takes a single time slot to transmit on the local bus. The specific types of bytes that are transferred are more thoroughly described below.

Figure 3:
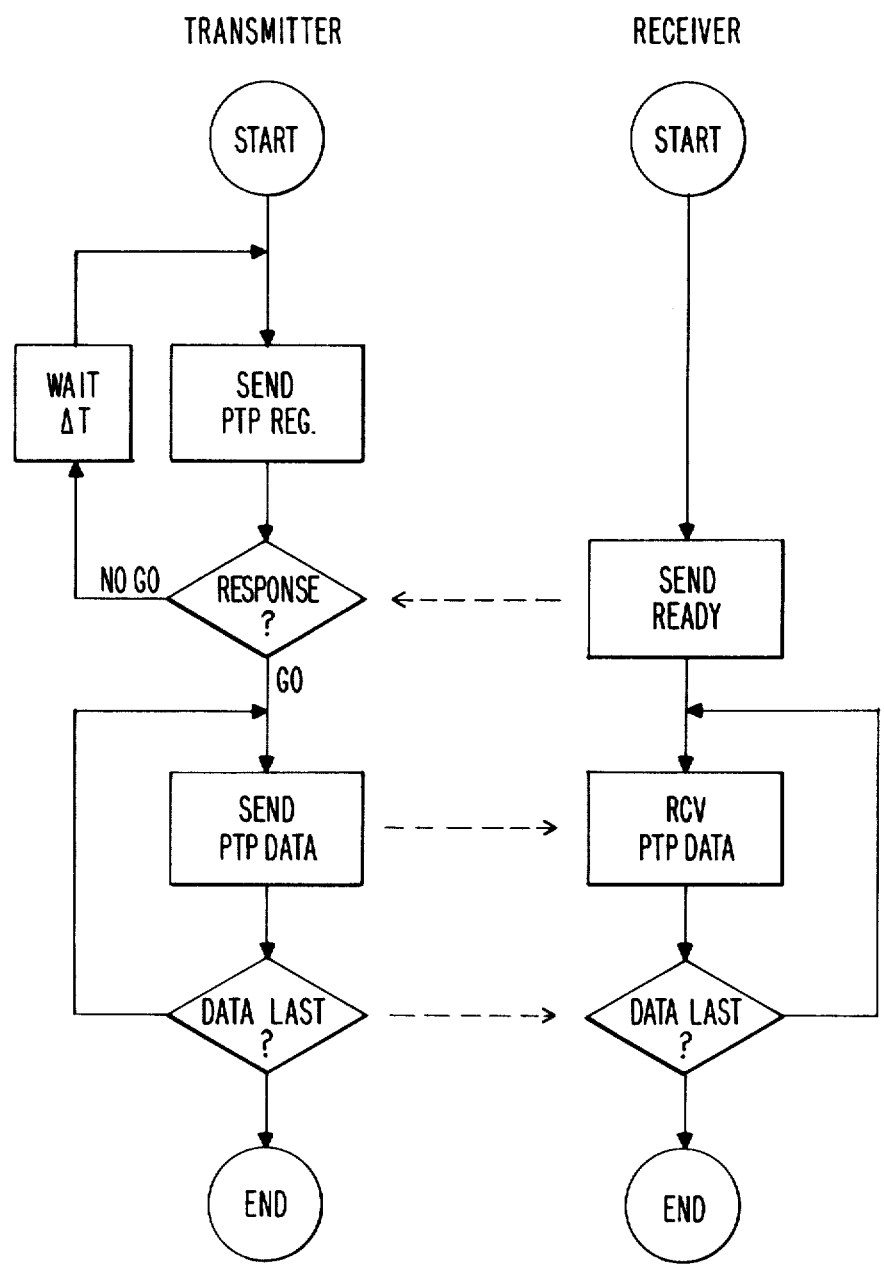
FIG. 3 is a diagram illustrating the protocols employed by the respective processors both when they are transmitting and receiving.

Various byte transfers are used in a rigid protocol to send a parcel of data point-to-point or by a broadcast mode. FIG. 3 is a flow chart showing how the byte level transfers are combined to send and receive a point-to-point parcel. The parcel level protocol is created naturally from this set of byte transfers. For a broadcast mode, the flow is the same except there are many destinations, and each transfer does not send the READY signal.

DETAILED DESCRIPTION OF THE INVENTION

Figure 4:
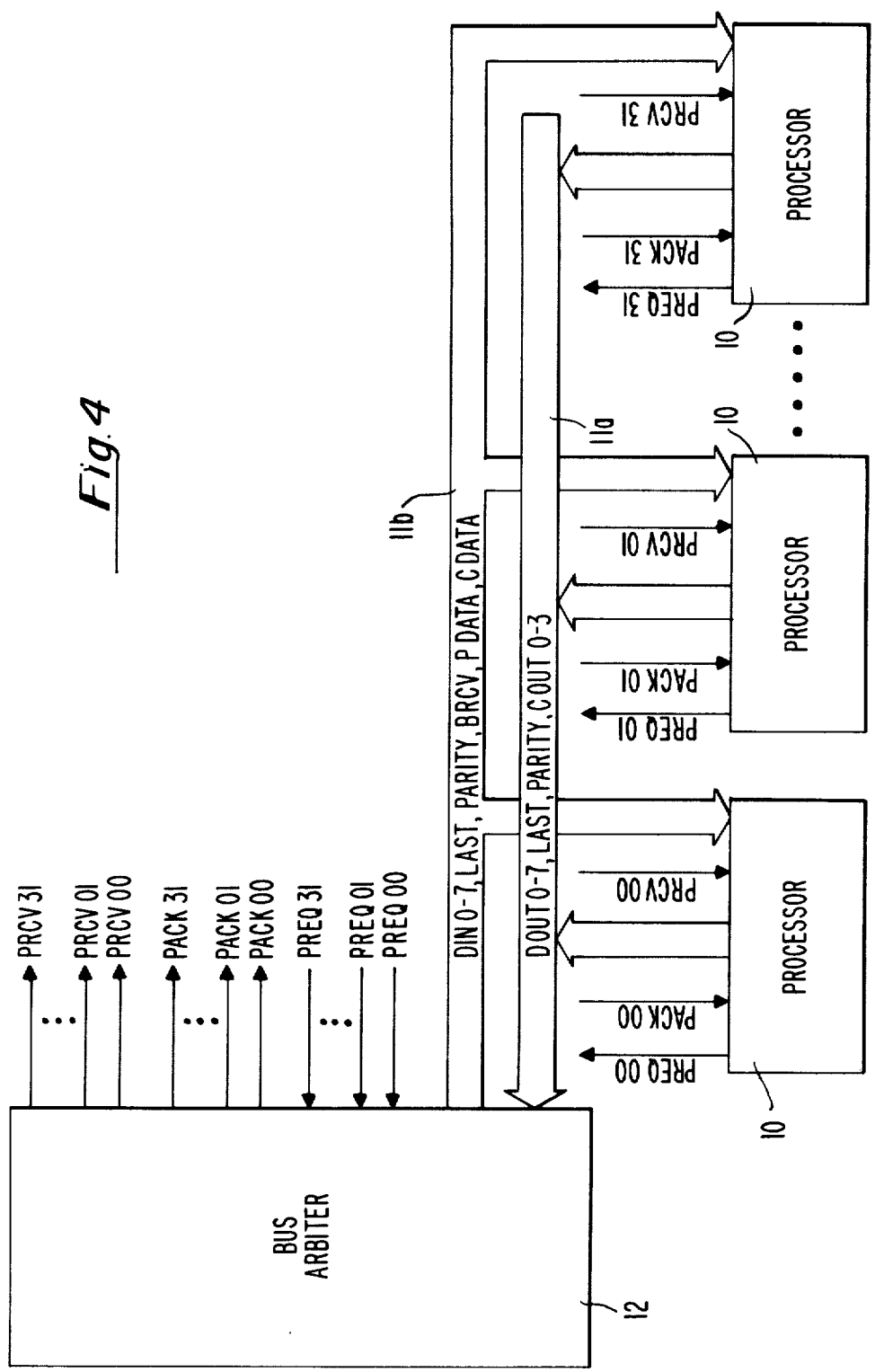
FIG. 4 is a more detailed diagram of the local bus connecting the processors and the bus arbiter of FIG. 1.

A more detailed schematic diagram of local bus 11 of FIG. 1 is illustrated in FIG. 4. Bus-out 11a transmits data to the bus arbiter 12 while bus-in 11b transmits data to the corresponding processor modules 10. Both bus-out 11a and bus-in 11b are unidirectional busses instead of these being one bidirectional bus. Bus-out 11a consists of eight bits of data, a parity bit, a last bit indicator, and four bits of control information. In addition, there are two signal lines for each processor, processor request(PREQ) and processor acknowledge (PACK). These signal lines provide a request-acknowledge handshake from each processor module 10 to bus arbiter 12. After loading a data byte to be sent, the corresponding processor module raises its processor request line. Sometime later, the bus arbiter responds with a processor acknowledge signal causing the data, control, parity, and last bit information to be strobed onto bus-out 11a. As was indicated above, this cycle continues to be repeated as long as any processor module 10 has a byte of data for transfer to bus arbiter 12.

Bus-in 11b from arbiter 12 to each of the processor modules 10 is also eight bits of data, parity, a last byte indicator and four bits of control information. The control lines are used to indicate whether the data is broadcast data, point-to-point data, or point-to-point control information. In broadcast mode, each of the processor interfaces contains a port or register to receive broadcast data. Otherwise, an individual strobe, one for each processor module 10, is ANDED with remaining control lines to decide whether to load a point-to-point request, data-in register, or control-in register in a respective interface 14 of FIG. 1. These registers are more thoroughly described below.

Figure 5:
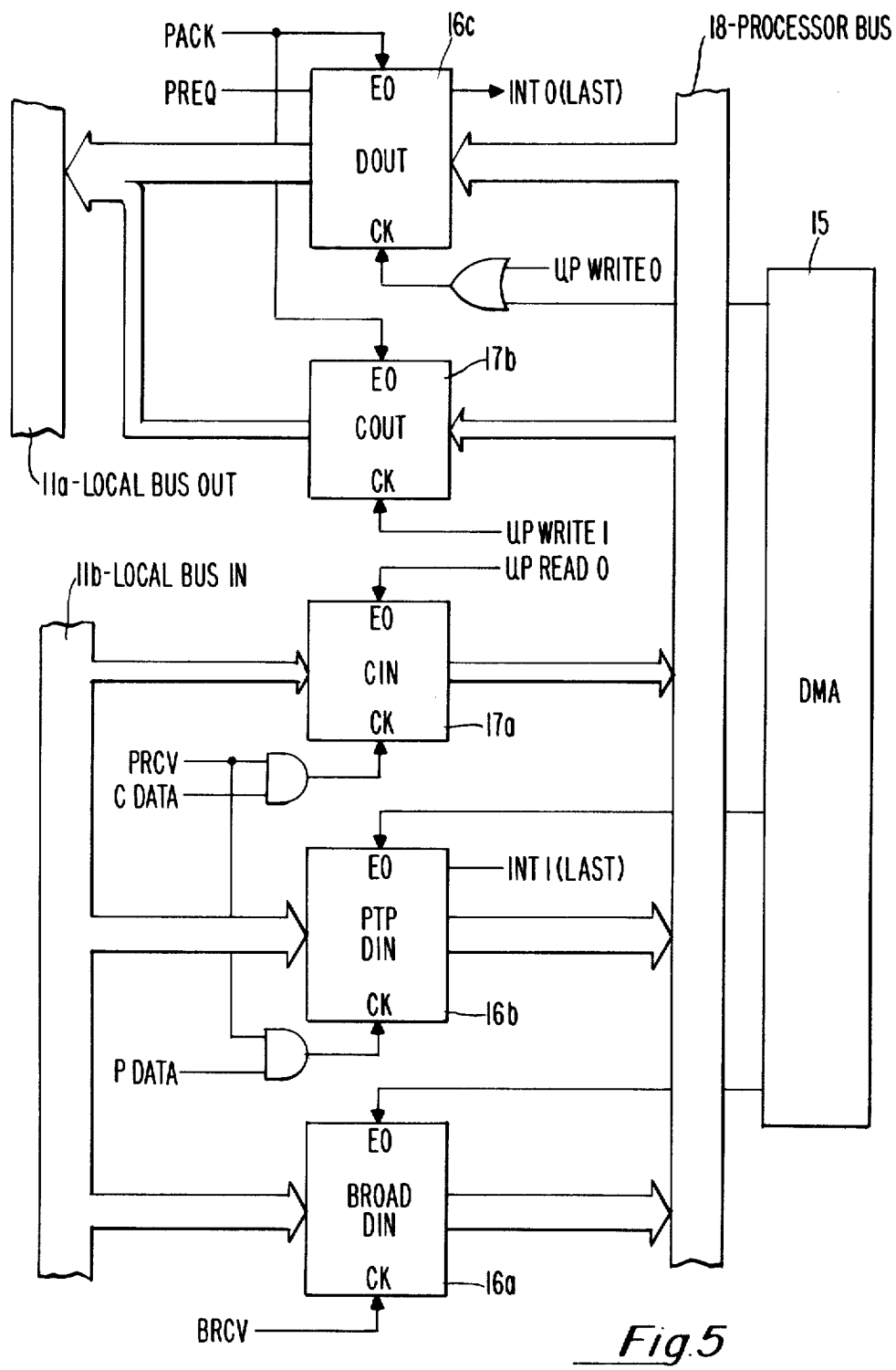
FIG. 5 is a diagram of the processor module interface provided for each processor module and by which each processor module communicates with the local bus of the present invention.

A more detailed schematic of each of the processor module interfaces 14 of FIG. 1 is illustrated in FIG. 5. Each interface must conform to the requirements for timing, buffering and so forth, for both the processor modules and the local bus of the present invention; The primary function of the interface of FIG. 5 is to send and receive the byte transfers that were described above. The circuitry of FIG. 5 includes a direct memory access (DMA) controller 15; three data registers 16a, b, and c, to respectively receive broadcast data-in, point-to-point data-in from local bus-in 11b, and to supply data-out to local bus-out 11a. The interface of FIG. 5 further includes control information-in register 17a and control information-out register 17b. Thus, the circuitry of FIG. 5 serves as a buffer between the local bus of the interconnect circuitry of the present invention and processor internal bus 18 that is part of the processor which may be commercially available as described above. Processor internal 18 is eight bits wide plus parity and acts as the central connection media between the processor, memory, direct memory access controller and the interface of FIG. 5.

The direct memory access controller allows for data transmission between the interface of FIG. 5 and the processor's memory without having to interrupt the processor for every transfer of a data byte from memory. Instead, the controller borrows memory cycles from the microprocessor. Actually, the direct memory access circuitry of FIG. 5 is three separate direct memory access channels, one each for the three data ports 16a, b, and c. Each direct memory access channel can be set up to access a different memory address, so that data parcels can come from and to software allocated buffer pools in the memory. It is possible for all three of the direct memory access channels to be in operation simultaneously. Since the basic data rate of a channel on the local bus is one byte every five to ten microseconds, the direct memory access controller must transfer a byte every 1.6 to 3.3 microseconds when fully utilized.

As was indicated above, the data ports allow for the overlap of broadcast and point-to-point reception as well as data-out transmission, although only one port can have access to the local bus during each time slot of transmission activity.

When data out-port, 16c has been loaded with a byte of information, it raises its request line to the bus arbiter signalling that there is a byte of data to be read. The bus arbiter then strobes the port which signals the direct memory access controller that the port has been read. Broadcast data-in port 16a and point-to-point data port 16b operate in a similar manner employing this request acknowledge routine with the bus arbiter. The receipt of a byte of information by one of the ports signals the direct memory access controller which unloads that port into the memory of the processor. Such an operation continues until the last bit is loaded into the port which initiates an interrupt request to the processor.

Control-in port 17a and control-out port 17b are employed for receiving and sending control information respectively to indicate the kind of data that is being transmitted on the bus. These ports can be respectively read or written into by the processor.

Figure 6:
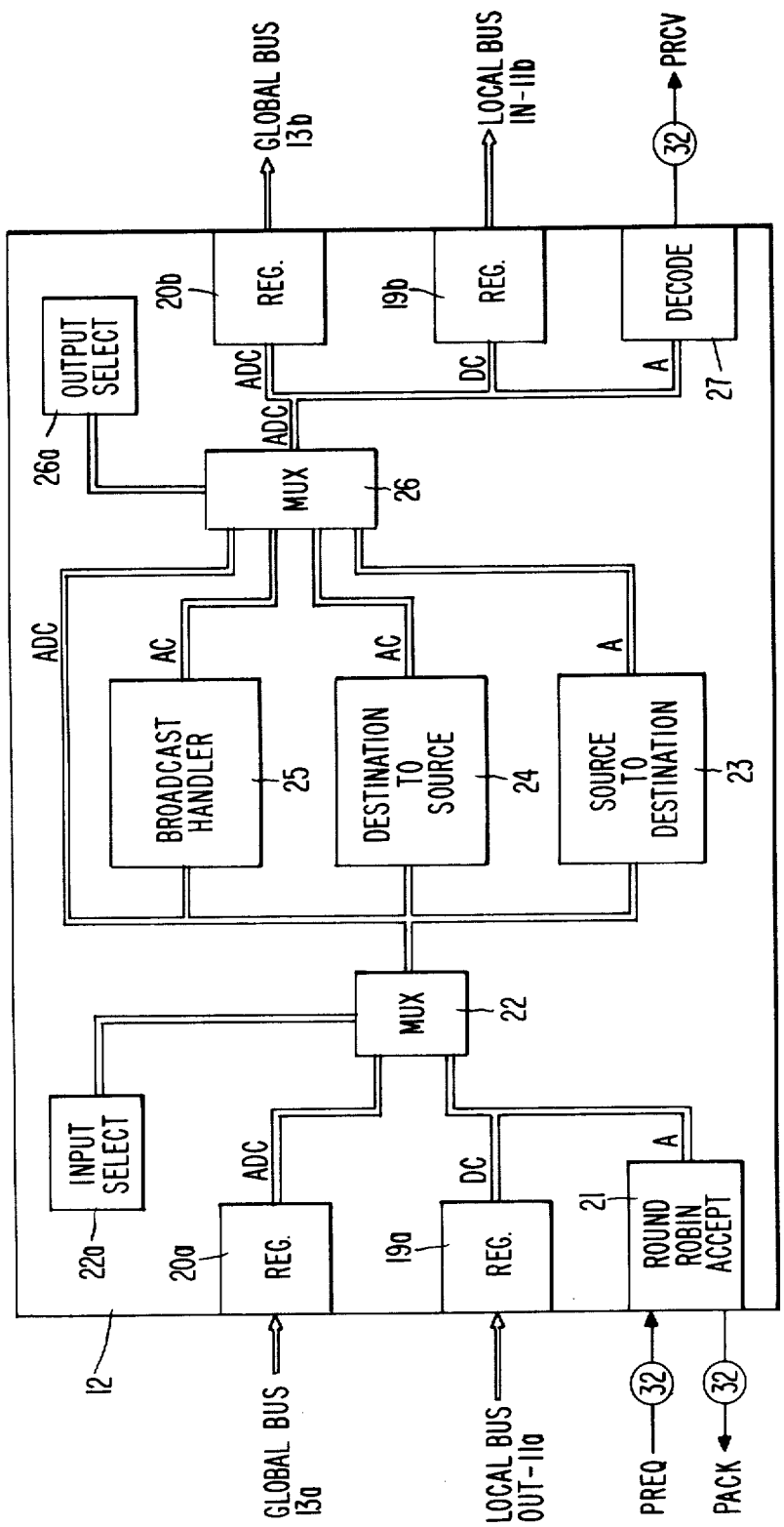
FIG. 6 is a diagram of the bus arbiter of the present invention including its interconnection to global busses for data communication with other arbiters.

The bus arbiter 12 of FIG. 1 is illustrated in more detail in FIG. 6 and controls protocol, timing and addressing of all byte transfers on the local bus 11 of FIG. 1 and the global busses 13a and b. More specifically, the bus arbiter of FIG. 6 controls the time multiplexing access to its corresponding local bus by the various processors, maintains request queues for point-to-point and broadcast destinations, maintains READY NOT READY status information for each destination channel, sends a GO or NO GO response to the source processors and maintains the source destination address conversion for point-to-point transmissions.

Transmission between the respective processors and the bus arbiter are by way of local bus input register 19a and local bus output register 19b while transmission between the arbiter and other arbiters, as described above, is by way of global bus input register 20a and global bus output register 20b. These four registers are operated on a time multiplexed byte transfer level. Time multiplexing starts on local bus input. A request for a byte transfer is raised by one or more of the processors with its separate processor request line. These lines connect to round-robin accept circuitry 21 which resolves priority between two processors requesting bus access at the same time. Logic 21 generates the processor acknowledgment signals and is time sequenced to achieve the resulting time multiplexing.

To achieve a byte transfer on the local bus for each clock time, the circuitry of FIG. 6 is pipelined so that a byte transfer to and from the bus arbiter occurs at the rate of one byte per clock time. Since there is only one byte transfer per clock, excessive logic is not required and transfer is completed on the next clock time, the byte being transmitted by way of local or global output ports(or both). Global input requests are given priority over each local bus request. When a byte of information is received either by local bus input register 19a or global bus register 28, it is transferred to one of six destinations by way of multiplexing switches 22 and 26. These destinations will now be described in regard to the various operations or transactions occurring on either the global or local busses.

When the processor transfers a byte requesting point-to-point transmission from the arbiter, the arbiter checks the destination address and, if the destination is not on the arbiter's local bus, the request is sent unmodified to global output register 20b from which the request traverses the global loop until it finds the appropriate bus arbiter.

If the data's destination address is on the arbiter's local bus, it is transmitted from bus input register 19a by way of multiplexing switch 22 to destination to source logic 24 which includes a table look-up memory to keep track of what source, if any, is sending data to that destination. If the destination is currently receiving transmission from another source, the request response NO GO byte is transmitted back to the source. If, on the other hand, the destination is free, the generated response is GO in which case the destination to source table in the logic 24 is written immediately with the new source and this locks out any other contenders for that destination. In any case, the response is routed back to the source. As was true with a request, the route may be up through the global loop before dropping onto the respective local bus.

Once a path has been established by a request for point-to-point data transfer, and the request-accept protocol established, the source continues to load a byte at a time onto its data out port and requests access to the local bus from the bus arbiter. The destination address is not sent across the local bus but instead is generated by the bus arbiter. This is accomplished by the source to destination logic 23 of FIG. 6. The circuitry takes the source address which is obtained from round-robin accept circuit 21 and compares it with the contents of a table of source and destinations link-ups in source to destination logic 23. This table is a memory that was loaded earlier by the point-to-point transfer request. The data byte from the source is now routed to the correct bus arbiter by the global loop and from there to the appropriate destination by the respective local bus.

A READY byte transfer completes the point-to-point parcel protocol. This byte tells the bus arbiter that the destination is able to take another parcel by clearing both the source number in the destination to source table 24 and destination number in the source to destination table 23.

Broadcast data transfers differ from point-to-point data transfers in that the data goes to all local busses rather than just one. Instead of sending the byte through the local or global output ports, the bus arbiter sends it to both of them. The same mechanism must limit the transfer so it doesn't circulate endlessly on the global loop. There is no READY command from the destination as there is in the point-to-point protocol. Instead, the end of the broadcast parcel is signalled by the LAST BIT sent along with the byte.

EPILOGUE

A high speed interconnect network has been described for a relatively large number of processors from as few as two to a hundred or more where the information transfers are serial-by-byte in a time multiplexed manner so that when one or more processors is ready to transmit, there will be an information byte being transmitted every clock time. A bus arbiter controls access to a local bus in a round-robin fashion when more than one processor is requesting access to the local bus. The bus arbiter also serves for connection to an overall global loop of bus arbiters each of which has a local bus and a plurality of individual processors. In this manner, a network of processors is created within which there is a high aggregate data transfer rate or throughput even though the data rates of the individual processors may be of an order of magnitude less.

While but one embodiment of the present invention has been disclosed, it will be understood by those skilled in the art that variations and modifications may be made therein without departing from the spirit and scope of the invention as claimed.

What is claimed is:

1. A network of processing elements, said network comprising:
    a network bus to receive an information segment of signals in parallel;
    a plurality of processing elements coupled to said bus, and
    bus control means coupled to said bus and to each of said processing elements to grant each processing element, requesting access to said bus, access to said bus for one time period in a sequence of time periods, said access being granted according to a predetermined order;
    said network bus including two unidirectional busses, one for transferring information to said control unit and one for transferring information from said control unit to one or more processing elements.

2. A network according to claim 1 wherein:
    said control unit includes receiving and transmitting means for receiving an information segment during one time period and transmitting said segment to one of said processing elements during the succeeding time period.

3. A network according to claim 2 wherein:
    said control unit includes a plurality of registers to store addresses of processing elements designated to receive information signals sent from other processing elements.

4. A network according to claim 3 wherein:
    each of said unidirectional busses includes a plurality of conductors to transmit a plurality of bits of information in parallel during each time period.

* * * * *